(12) United States Patent
Rogers et al.

(10) Patent No.: US 11,009,126 B2
(45) Date of Patent: May 18, 2021

(54) CONTROL-LINKAGE ASSEMBLY FOR A DIFFERENTIAL OF A VEHICLE AND AN AXLE ASSEMBLY FOR A VEHICLE

(71) Applicant: GM GLOBAL TECHNOLOGY OPERATIONS LLC, Detroit, MI (US)

(72) Inventors: Andrew Rogers, Shelby Township, MI (US); Sean Gaw, Troy, MI (US); Daniel J. Parrino, Madison Heights, MI (US); Brian V. Castillo, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 16/437,528

(22) Filed: Jun. 11, 2019

(65) Prior Publication Data
US 2020/0393042 A1 Dec. 17, 2020

(51) Int. Cl.
*F16H 63/16* (2006.01)
*B60K 23/04* (2006.01)
*B62D 11/10* (2006.01)

(52) U.S. Cl.
CPC ............. *F16H 63/16* (2013.01); *B60K 23/04* (2013.01); *B62D 11/10* (2013.01)

(58) Field of Classification Search
CPC .......... B60K 23/04; B62D 11/10; F16H 63/16
See application file for complete search history.

(56) References Cited

U.S. PATENT DOCUMENTS

| | | | | |
|---|---|---|---|---|
| 1,693,288 A * | 11/1928 | Walker | ...................... | B60S 9/21 180/200 |
| 2,299,900 A * | 10/1942 | Jackson | .................. | B60G 11/34 280/124.107 |
| 2,300,844 A * | 11/1942 | Olley | ....................... | B60G 9/00 180/349 |
| 2,323,007 A * | 6/1943 | Borgward | ................ | B60G 9/00 267/66 |
| 3,869,015 A * | 3/1975 | Allison | ..................... | B60G 7/00 180/352 |
| 4,284,158 A * | 8/1981 | Schield | .................. | B60K 17/16 180/344 |
| 5,458,359 A * | 10/1995 | Brandt | ..................... | B60G 9/00 180/349 |
| 6,042,131 A * | 3/2000 | Bailey | ..................... | B60G 9/02 180/352 |

(Continued)

*Primary Examiner* — Faye M Fleming
(74) *Attorney, Agent, or Firm* — Quinn IP Law

(57) ABSTRACT

A control-linkage assembly for a differential of a vehicle includes a differential housing and a linkage apparatus. The differential housing includes sides spaced from each other relative to a lateral axis. The sides each define a respective hole along the lateral axis. The differential housing includes a front end and a rear end spaced from each other relative to a central axis. The differential housing includes a support at the front end. The linkage apparatus is coupled to the support to control motion of the differential housing. An axle assembly for a vehicle includes an axle housing and the control-linkage assembly coupled to the axle housing. The control-linkage assembly includes the differential housing and the linkage apparatus as discussed above. The differential housing is fixed to the axle housing to form a unit. The linkage apparatus is coupled to the support to control motion of the unit.

20 Claims, 3 Drawing Sheets

(56) References Cited

U.S. PATENT DOCUMENTS

| | | | | |
|---|---|---|---|---|
| 8,943,696 B2* | 2/2015 | Oprea | ................... | B60G 9/025<br>29/897.2 |
| 10,639,952 B2* | 5/2020 | Brown | ................... | B60G 9/00 |

* cited by examiner

CONTROL-LINKAGE ASSEMBLY FOR A DIFFERENTIAL OF A VEHICLE AND AN AXLE ASSEMBLY FOR A VEHICLE

INTRODUCTION

Vehicles have been developed with various types of suspension systems. Some vehicles have a Watts link or linkage that locates a solid axle laterally and/or that limits roll motions of the vehicle. Generally, the Watts link is attached to a rear side of a differential (the rear side of the differential being in the direction that faces the rear bumper of the vehicle) and a frame.

SUMMARY

The present disclosure provides a control-linkage assembly for a differential of a vehicle. The control-linkage assembly includes a differential housing and a linkage apparatus. The differential housing includes a first side and a second side spaced from each other relative to a lateral axis. The first and second sides each define a respective hole along the lateral axis. Additionally, the differential housing includes a front end and a rear end spaced from each other relative to a central axis. The central axis is transverse to the lateral axis. The differential housing includes a support at the front end. The linkage apparatus is coupled to the support to control motion of the differential housing.

The control-linkage assembly optionally includes one or more of the following:

A) a pinion disposed inside the differential housing and part of the linkage apparatus surrounds the pinion;

B) the linkage apparatus includes a pivot coupled to the support;

C) the pivot is defined as the part of the linkage apparatus;

D) the pivot is rotatable about the central axis relative to the support;

E) the support includes a sleeve fixed to the differential housing at the front end;

F) the pinion is disposed inside the sleeve;

G) the pivot is supported via the sleeve;

H) the front end of the differential housing defines an aperture along the central axis;

I) a connector attached to the pinion which closes the aperture at the front end;

J) the connector is flared such that the pivot is disposed between the connector and part of the differential housing;

K) the support protrudes from the front end;

L) the pinion is disposed inside the support;

M) the pivot surrounds the support;

N) a bearing disposed between the support and the pivot, and wherein the pivot surrounds the bearing;

O) the linkage apparatus includes a first link attached to the pivot at a first pivot point;

P) the linkage apparatus includes a second link attached to the pivot at a second pivot point;

Q) the first and second pivot points oppose each other;

R) the pinion disposed inside the differential housing at the front end;

S) the pinion is rotatable about the central axis independently of the pivot;

T) the pivot is rotatable about the central axis in response to movement of the first and second links;

U) a restrictor that is supported via the differential housing, and configured to selectively restrict rotation of the pivot; and V) a portion of the restrictor is movable between a disengaged position in which the portion of the restrictor is spaced from the pivot and an engaged position in which the portion of the restrictor engages the pivot to restrict rotation of the pivot.

The present disclosure also provides an axle assembly for a vehicle. The axle assembly includes an axle housing and the control-linkage assembly coupled to the axle housing. The control-linkage assembly includes the differential housing and the linkage apparatus as discussed above. The differential housing is fixed to the axle housing to form a unit. The linkage apparatus is coupled to the support to control motion of the unit.

The axle assembly optionally includes one or more of the following:

A) a pinion disposed inside the differential housing, and the support surrounds the pinion;

B) a drive shaft coupled to the pinion at the front end of the differential housing;

C) a connector attached to the pinion at the front end;

D) the drive shaft is attached to the connector to transfer rotation between the drive shaft and the pinion;

E) the linkage apparatus includes a pivot coupled to the support and the pivot surrounds the pinion;

F) the pivot is rotatable about the central axis relative to the support;

G) the pinion is rotatable about the central axis independently of the pivot;

H) the support includes a sleeve fixed to the differential housing at the front end;

I) the pinion is disposed through the sleeve;

J) the pivot is supported via the sleeve;

K) the support protrudes from the front end;

L) the pinion is disposed through the support; and

M) the pivot surrounds the support.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
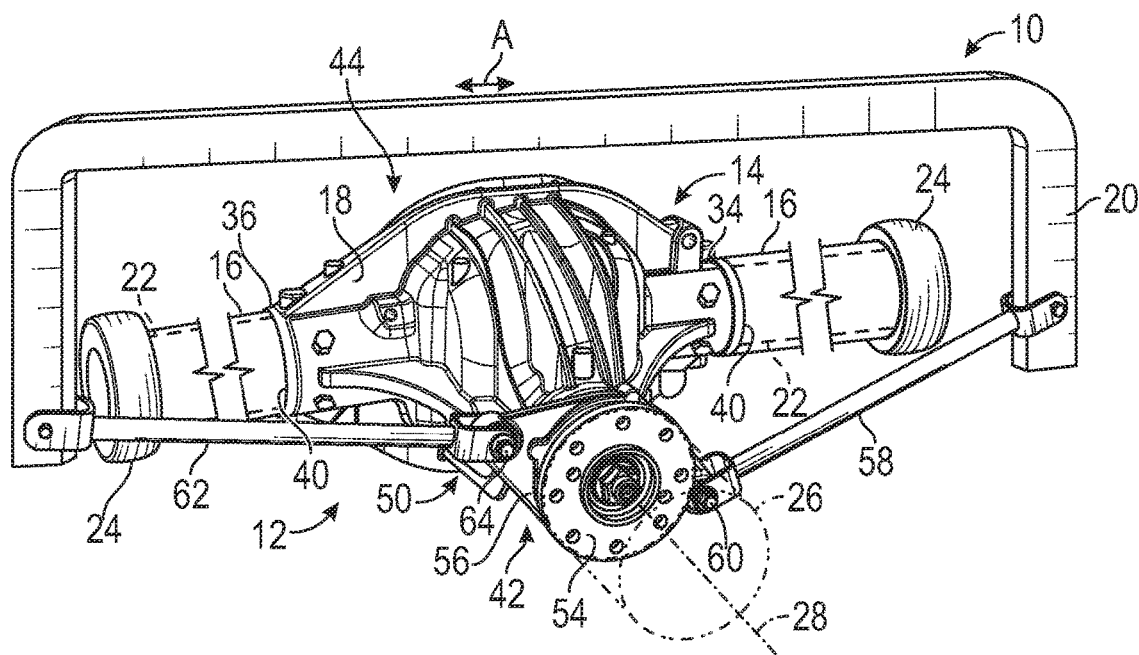
FIG. 1 is a schematic fragmentary perspective view of an axle assembly and a control-linkage assembly, with a differential housing and an axle housing fixed to each other to form a unit.

Referring to the FIGS., wherein like numerals indicate like or corresponding parts throughout the several views, an axle assembly 10 for a vehicle and a control-linkage assembly 12 for a differential 14 of the vehicle are generally shown in FIG. 1. The control-linkage assembly 12 generally controls movement, which will be discussed in detail below. The control-linkage assembly 12 provides compact packaging with fewer parts than a Watts link as discussed in the introduction. Therefore, the control-linkage assembly 12 herein provides a cost savings. FIG. 1 is representative of any of the configurations discussed herein.

The vehicle that may utilize the axle assembly 10 and/or the control-linkage assembly 12 may be an automotive vehicle, such as, a car, a truck, an off-road vehicle, an all-terrain vehicle, etc. It is to be appreciated that the vehicle may alternatively be a non-automotive vehicle, such as, a farm vehicle, a marine vehicle, an aviation vehicle, etc. Furthermore, the vehicle may be a hybrid vehicle, an electric vehicle, a traditional gas vehicle, or any other suitable moveable platform utilizing the axle assembly 10 and/or the control-linkage assembly 12 disclosed herein.

Continuing with FIG. 1, the axle assembly 10 includes an axle housing 16 and the control-linkage assembly 12 is coupled to the axle housing 16. Generally, the axle housing 16 is fixed to differential 14. More specifically, the differential 14 may include a differential housing 18 that is fixed to the axle housing 16 to form a unit. The differential housing 18 and the axle housing 16 are fixed to each other such that the unit is movable together as one-single structure. The differential housing 18 and the axle housing 16 being fixed to each other in this manner may be referred to as a solid axle.

A frame 20, a body, a chassis, or a foundation structure (see FIG. 1) may support the axle assembly 10 and the control-linkage assembly 12. More specifically, the axle housing 16 and the differential housing 18 are coupled to the frame 20 through the control-linkage assembly 12. The way the frame 20 cooperates with the differential 14 will be discussed further below. In certain configurations, the vehicle may include the frame 20, the body, the chassis, or the foundation structure.

The axle housing 16 may have one portion of the housing fixed to one side of the differential 14, and another portion of the housing fixed to another side of the differential 14 as shown in FIG. 1. The axle assembly 10 also includes a pair of axle shafts 22 disposed inside the axle housing 16, and the axle shafts 22 are rotatable. The axle shafts 22 are coupled to each other inside the differential 14. The axle shafts 22 are coupled to respective wheels 24 to drive the wheels 24 which propel the vehicle.

Additionally, the axle assembly 10 includes a drive shaft 26 coupled to the differential 14, and the axle shafts 22 are coupled to the differential 14 as well. Therefore, the drive shaft 26 and the axle shafts 22 are coupled to each other through the differential 14. The drive shaft 26 is rotatable about a central axis 28 in response to operation of a powertrain of the vehicle. Torque is transferred via the drive shaft 26 to the axle shafts 22, and then this torque is transferred from the axle shafts 22 to the wheels 24 to propel the vehicle. Generally, the differential 14 allows the wheels 24 to be driven via torque from the drive shaft 26 to rotate at different speeds. For example, one of the wheels 24 may spin at a different speed than the other one of the wheels 24 when the vehicle is traveling along a curve in a road.

The differential 14 may include various components, to transfer torque from the drive shaft 26 to the axle shafts 22 and allow the wheels 24 to spin at different speeds. Non-limiting examples of the various components of the differential 14 may include one or more of pinion(s) 30, gear(s), bearing(s) 52, bushing(s), etc., are disposed inside the differential housing 18 to transfer torque to the wheels 24 to propel the vehicle. Some of the components of the differential 14 are discussed below.

Figure 2:
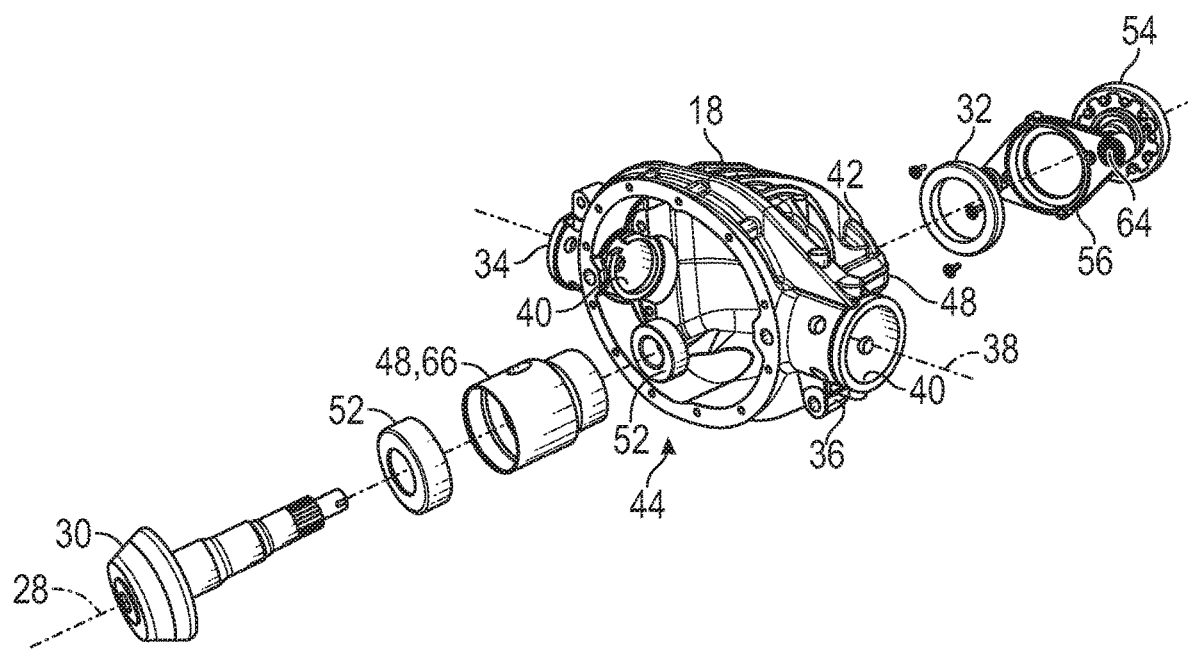
FIG. 2 is a schematic exploded view of part of a differential and part of the control-linkage assembly.

As best shown in FIGS. 1 and 2, the differential housing 18 includes a first side 34 and a second side 36 spaced from each other relative to a lateral axis 38. The first and second sides 34, 36 each define a respective hole 40 along the lateral axis 38. The axle shafts 22 are disposed in the holes 40. Therefore, the axle shafts 22 are disposed axially along the lateral axis 38, and rotatable about the lateral axis 38. In certain configurations, the axle shafts 22 are concentric with the lateral axis 38.

Again, as best shown in FIGS. 1 and 2, the differential housing 18 also includes a front end 42 and a rear end 44 spaced from each other relative to the central axis 28. The drive shaft 26 is coupled to the components of the differential 14 along the front end 42. In certain configurations the drive shaft 26 is concentric with the central axis 28. Generally, the central axis 28 is transverse to the lateral axis 38. Therefore, the drive shaft 26 is disposed in a different direction than the axle shafts 22. In certain configurations, the central axis 28 is orthogonal to the lateral axis 38. The central axis 28 and the lateral axis 38 may be offset from each other in certain configuration or intersect each other in other configurations. The front end 42 of the differential housing 18 may define an aperture 46 along the central axis 28. In certain configurations, the aperture 46 is concentric with the central axis 28.

Referring to FIGS. 1-4, the differential housing 18 includes a support 48 at the front end 42. Generally, the support 48 protrudes from the front end 42 of the differential housing 18. The support 48 may surround the aperture 46, and in certain configurations, the support 48 may define the aperture 46. The support 48 may be integral with the differential housing 18 or may be one or more separate pieces fixed to the differential housing 18. The support 48 is configured to support various components of the control-linkage assembly 12 as discussed below.

In certain configurations, the control-linkage assembly 12 includes the differential housing 18 and also includes a linkage apparatus 50 (see FIG. 1) coupled to the differential housing 18. Generally, the linkage apparatus 50 is coupled to the support 48 to control motion of the differential housing 18. More specifically, in certain configurations, the linkage apparatus 50 is coupled to the support 48 to control motion of the unit. The linkage apparatus 50 is coupled to the frame 20 and the front end 42 of the differential housing 18 to control lateral motion of the unit relative to the lateral axis 38. Additionally, the linkage apparatus 50 provides improved performance with regard to roll motion of the vehicle.

Figure 3:
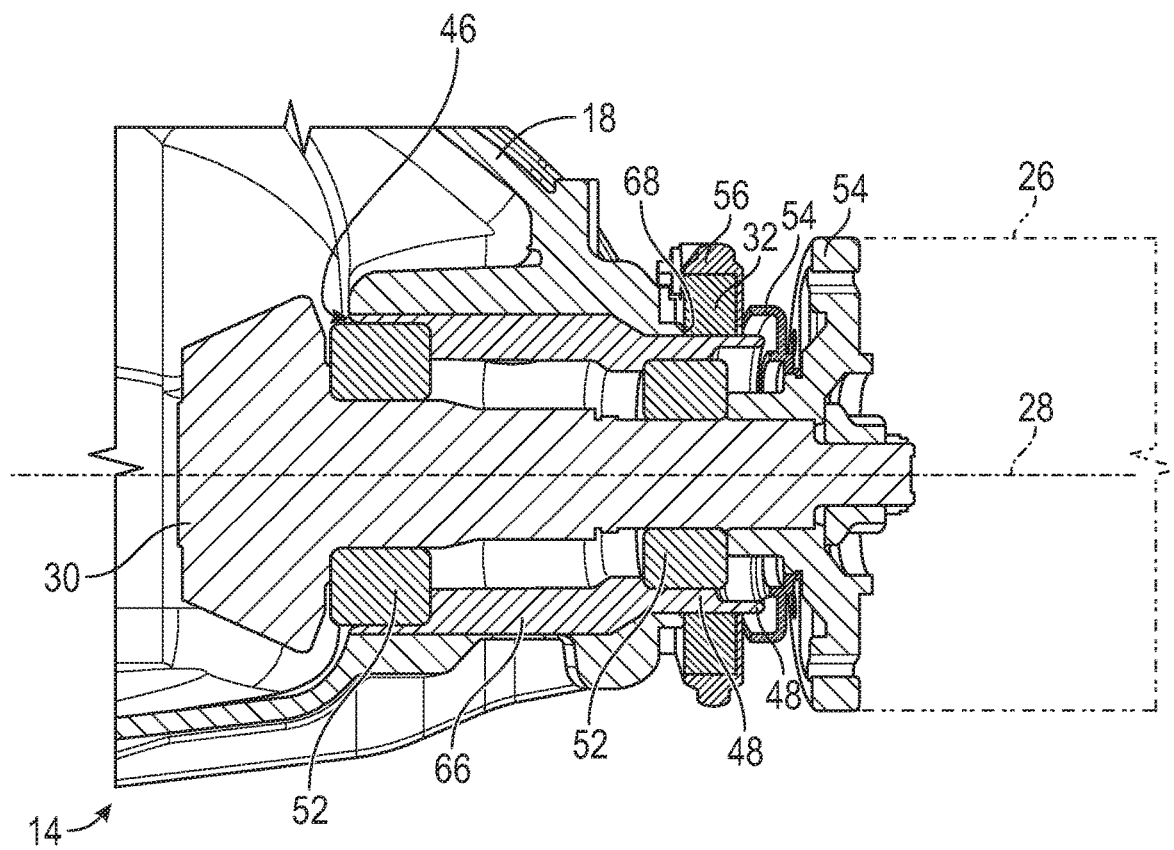
FIG. 3 is a schematic fragmentary cross-sectional view of the components of FIG. 2.
Figure 4:
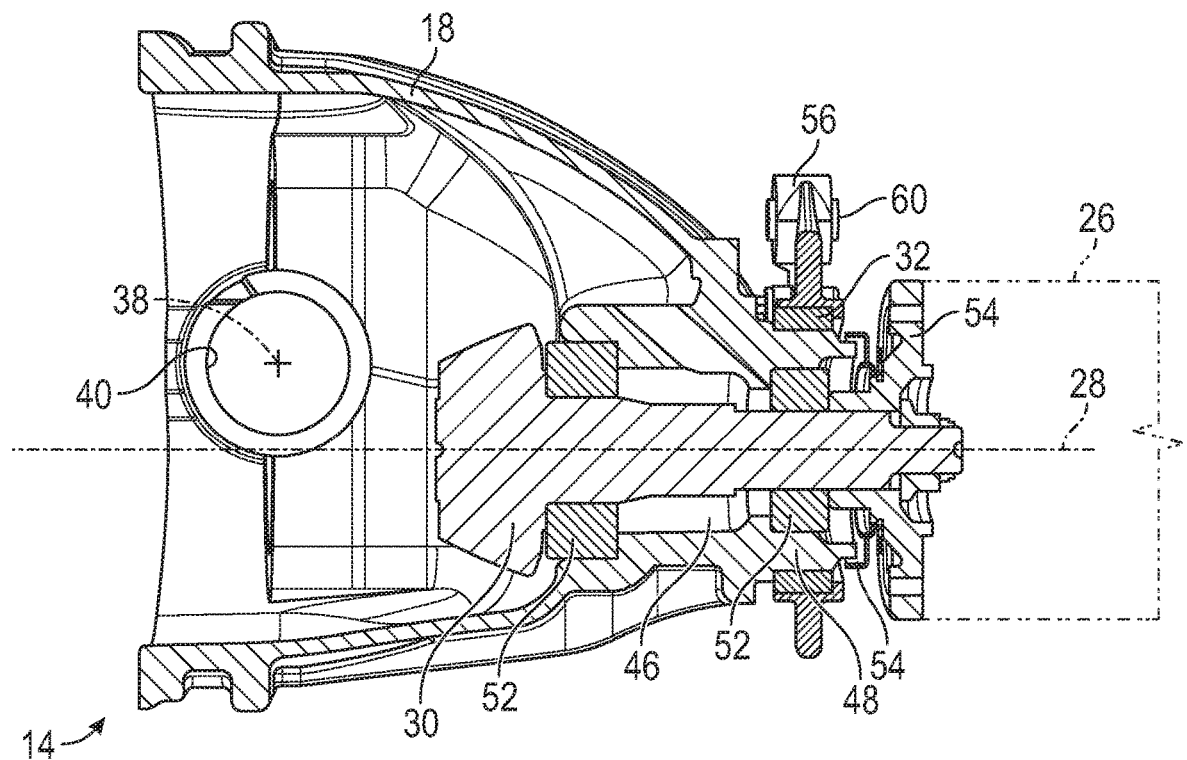
FIG. 4 is a schematic fragmentary cross-sectional view of a pivot press-fit to a support of the differential housing.

Referring to FIGS. 3 and 4, the differential 14 may also include a pinion 30 disposed inside the differential housing 18. In certain configurations, the pinion 30 is disposed inside the differential housing 18 at the front end 42. Therefore, in certain configurations, the pinion 30 is disposed in the aperture 46 of the differential housing 18. The drive shaft 26 may be coupled to the pinion 30 at the front end 42 of the differential housing 18. Specifically, torque from rotation of the drive shaft 26 is transferred to the pinion 30 of the differential 14, and then through the other components of the differential 14 out to the axle shafts 22. In certain configurations, the pinion 30 and the drive shaft 26 are concentric relative to the central axis 28.

The control-linkage assembly 12 may also include the pinion 30 disposed inside the differential housing 18. Generally, the support 48 surrounds the pinion 30. Furthermore, parts of the linkage apparatus 50 surround the pinion 30.

Referring to FIGS. 2-4, the differential 14 may further include one or more pinion bearings 52 that surround the pinion 30. The pinion bearings 52 suspend the pinion 30 inside the differential housing 18, and more specifically in the aperture 46. The pinion bearings 52 may be directly or indirectly attached to the differential housing 18 (compare FIGS. 3 and 4).

Referring to FIGS. 2-4, the differential 14 and the control-linkage assembly 12 may include a connector 54 attached to the pinion 30 at the front end 42. Generally, the connector 54 is attached to the pinion 30 which closes the aperture 46 at the front end 42. Additionally, the drive shaft 26 is attached to the connector 54 to transfer rotation between the drive shaft 26 and the pinion 30. More specifically, the drive shaft 26 transfers torque to the pinion 30 through the connector 54, and the various components of the differential 14, and then out to the wheels 24 through the axle shafts 22.

Turning to FIGS. 1-4, the linkage apparatus 50 may include a pivot 56 coupled to the support 48. Generally, the pivot 56 surrounds the pinion 30, and the pivot 56 is rotatable about the central axis 28 relative to the support 48. The pinion 30 is rotatable about the central axis 28 independently of the pivot 56. Therefore, the pinion 30 and the pivot 56 are rotatable separately from each other. Furthermore, the pivot 56 is disposed outside of the differential housing 18, and faces in the direction of the drive shaft 26. The connector 54 may be flared such that the pivot 56 is disposed between the connector 54 and part of the differential housing 18. Additionally, the connector 54 may act as a stop to prevent the pivot 56 from detaching from the differential housing 18. The pivot 56 is defined as the part of the linkage apparatus 50.

Figure 5:
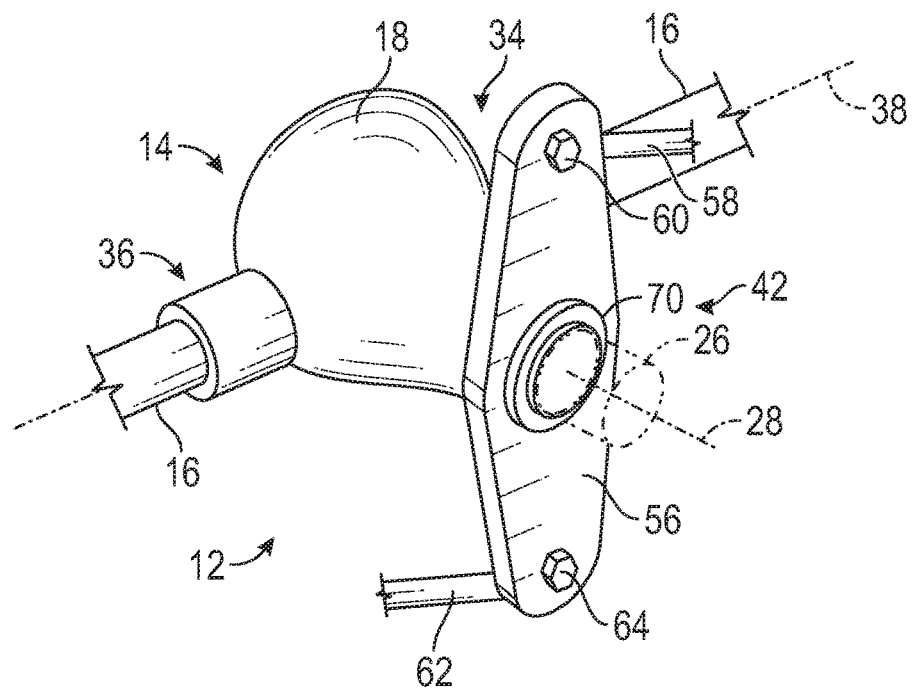
FIG. 5 is a schematic perspective view of a restrictor disposed adjacent to the pivot.

Turning to FIGS. 1 and 5, the linkage apparatus 50 also includes a first link 58 attached to the pivot 56 at a first pivot point 60. Additionally, the linkage apparatus 50 further includes a second link 62 attached to the pivot 56 at a second pivot point 64. Generally, the first and second pivot points 60, 64 oppose each other. Also generally, the first and second links 58, 62 extend in a cross-car direction (see arrow A in FIG. 1). Therefore, the cross-car direction is laterally between passenger side doors of the vehicle. The first and second links 58, 62 are attached to the frame 20 at separate locations relative to the cross-car direction. For example, the first link 58 may be disposed along the one portion of the axle housing 16 between the differential 14 and the frame 20 relative to one of the wheels 24, and the second link 62 may be disposed along the other portion of the axle housing 16 between the differential 14 and the frame 20 relative to another one of the wheels 24. The first and second links 58, 62 of FIG. 1 also apply to FIGS. 2-4 even though the links 58, 62 are not illustrated in those figures.

The control-linkage assembly 12 is disposed along the front end 42 of the differential housing 18 instead of the rear end 44 of the differential housing 18. Therefore, the control-linkage assembly 12 faces the drive shaft 26. The placement of the control-linkage assembly 12 provides compact packaging with fewer parts than a Watts link as discussed in the introduction because this assembly is incorporated into existing structures, thus reducing costs, mass, and complexity.

The pivot 56 is rotatable about the central axis 28 in response to movement of the first and second links 58, 62. More specifically, as the vehicle travels along the road, curves and/or irregular terrain causes movement in the frame 20 and/or the unit, and the connections between the first and second links 58, 62, the pivot 56, and the differential 14 provides a way to control lateral movement relative to the lateral axis 38 or roll of the unit. The first and second links 58, 62 change position or orientation due to forces acting on the frame 20 and the unit as the vehicle travels along the road, which causes the pivot 56 to rotate about the central axis 28, and also allows the unit to move transverse (or up and down) relative to the central axis 28. The location of the pivot 56 on the differential housing 18 allows roll center height to be maintained relative to the location of the pinion 30. The first and second links 58, 62 are defined as the part of the linkage apparatus 50.

Referring to FIGS. 2-4, the differential 14 and the control-linkage assembly 12 may also include a bearing 32 disposed between the support 48 and the pivot 56. The pivot 56 surrounds the bearing 32. The bearing 32 may be press-fit directly or indirectly to the differential housing 18, which will be discussed further below. It is to be appreciated that a plurality of the bearings 32 may be used.

In certain configurations, the support 48 may include various components. For example, referring to FIGS. 2 and 3, the support 48 may include a sleeve 66 fixed to the differential housing 18 at the front end 42. The sleeve 66 may be press-fit to the differential housing 18 such that the sleeve 66 is stationary relative to the differential housing 18. It is to be appreciated that the sleeve 66 may be fixed to the differential housing 18 by any suitable method.

In this configuration, the pinion 30 is disposed inside the sleeve 66 and the pivot 56 is supported via the sleeve 66. Therefore, in this configuration, the sleeve 66 may define part of the aperture 46. The pinion 30 may be disposed through the sleeve 66, and therefore, part of the pinion 30 may be disposed outside of the ends 42, 44 of the sleeve 66. The pinion bearings 52 may be fixed to the sleeve 66. In certain configurations, the pinion bearings 52 are press-fit to the sleeve 66 or fixed to the sleeve 66 by any suitable methods. Furthermore, the bearing 32 of the control-linkage assembly 12 may be disposed around the sleeve 66 between the pivot 56 and the sleeve 66. The bearing 32 may be press-fit to the sleeve 66 or fixed/disposed about the sleeve 66 by any suitable method. In the configuration of FIG. 3, axial movement of the pivot 56 and the bearing 32 relative to the central axis 28 may be limited via a shoulder 68 of the support 48 of the differential housing 18 and the connector 54.

As mentioned above, the support 48 protrudes from the front end 42. Referring to FIG. 4, the sleeve 66 is eliminated. The pinion 30 may be disposed inside the support 48, and the pivot 56 surrounds the support 48, as also discussed above for FIGS. 2 and 3. The pinion 30 may be disposed through the support 48, and therefore, part of the pinion 30 may be disposed outside of the support 48, as also discussed for FIGS. 2 and 3. In the configuration of FIG. 4, the bearing 32 of the pivot 56 may be press-fit to the differential housing 18, or fixed to the differential housing 18 by any suitable methods. It is to be appreciated that the sleeve 66 of FIG. 3 is optional, and instead of the sleeve 66, the differential housing 18 may be extended similar to FIG. 4 to support the pivot 56.

Figure 6:
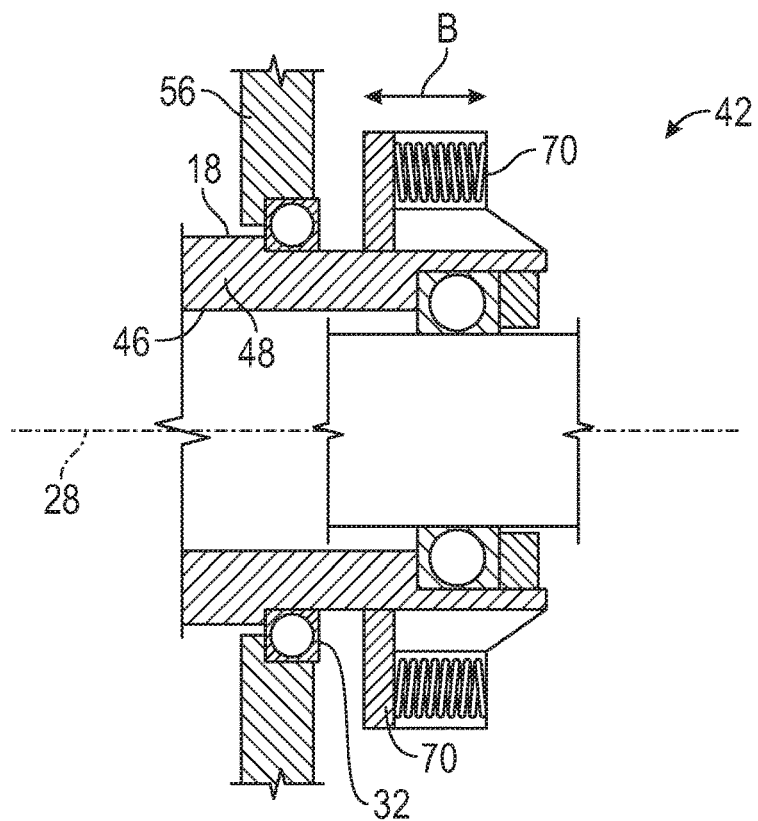
FIG. 6 is a schematic fragmentary cross-sectional view of the restrictor of FIG. 5.

Referring to FIGS. 5 and 6, the control-linkage may optionally include a restrictor 70 that is supported via the differential housing 18. The restrictor 70 may be coupled to the support 48, the differential housing 18 spaced from the support 48, or disposed in any other suitable location. The restrictor 70 is configured to selectively restrict rotation of the pivot 56. By selectively restricting rotation of the pivot 56, roll compliance of the vehicle may be changed, for example, during cornering (traveling along the curve in the road).

A portion of the restrictor 70 is movable between a disengaged position in which the portion of the restrictor 70 is spaced from the pivot 56 and an engaged position in which the portion of the restrictor 70 engages the pivot 56 to restrict rotation of the pivot 56. When the restrictor 70 is in the disengaged position, the pivot 56 is freely rotatable about the central axis 28. Arrow B in FIG. 6 is illustrative of the optional movement of the portion of the restrictor 70.

Any of the configurations discussed and illustrated herein may include the restrictor 70. Therefore, FIGS. 5 and 6 with the restrictor 70 are illustrative of any of the configurations of FIGS. 1-4 that may utilize the restrictor 70. The restrictor 70 may be any suitable configuration to restrict rotation of the pivot 56, and non-limiting examples may include a clutch, a torsion spring, a friction sleeve 66, or any other suitable structure to restriction rotation of the pivot 56. The restrictor 70 may be controlled mechanically, electro-mechanically, electrically, hydraulically, or any other suitable way to control restriction of the rotation of the pivot 56.

It is to be appreciated that the restrictor 70 may be controlled via a controller, and therefore, the controller may be in electrical communication with the restrictor 70. The controller may be configured to execute the instructions from a memory, via a processor. For example, the controller may be a host machine or distributed system, e.g., a computer such as a digital computer or microcomputer, and, as the memory, tangible, non-transitory computer-readable memory such as read-only memory (ROM) or flash memory. The controller may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller may include all software, hardware, memory, algorithms, connections, sensors, etc., necessary to control, for example, the restrictor 70. As such, a control method operative to control the restrictor 70 may be embodied as software or firmware associated with the controller. It is to be appreciated that the controller may also include any device capable of analyzing data from various sensors, comparing data, making the necessary decisions required to control and/or monitor the restrictor 70.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A control-linkage assembly for a differential of a vehicle, the control-linkage assembly comprising:
    a differential housing including a first side and a second side spaced from each other relative to a lateral axis, and the first and second sides each define a respective hole along the lateral axis;
    wherein the differential housing includes a front end and a rear end spaced from each other relative to a central axis, and the central axis is transverse to the lateral axis;
    wherein the differential housing includes a support at the front end;
    a linkage apparatus is coupled to the support to control motion of the differential housing; and
    a pinion disposed inside the differential housing and part of the linkage apparatus surrounds the pinion.

2. The assembly as set forth in claim 1 wherein the linkage apparatus includes a pivot coupled to the support and the pivot is defined as the part of the linkage apparatus, and wherein the pivot is rotatable about the central axis relative to the support.

3. The assembly as set forth in claim 2 wherein:
    the support includes a sleeve fixed to the differential housing at the front end;
    the pinion is disposed inside the sleeve; and
    the pivot is supported via the sleeve.

4. The assembly as set forth in claim 3 wherein the front end of the differential housing defines an aperture along the central axis, and further including a connector attached to the pinion which closes the aperture at the front end, and the connector is flared such that the pivot is disposed between the connector and part of the differential housing.

5. The assembly as set forth in claim 2 wherein:
    the support protrudes from the front end;
    the pinion is disposed inside the support; and
    the pivot surrounds the support.

6. The assembly as set forth in claim 2 further including a bearing disposed between the support and the pivot, and wherein the pivot surrounds the bearing.

7. The assembly as set forth in claim 1 wherein the linkage apparatus includes a pivot coupled to the support, and the pivot is rotatable about the central axis relative to the support.

8. The assembly as set forth in claim 7 wherein the linkage apparatus includes a first link attached to the pivot at a first pivot point.

9. The assembly as set forth in claim 8 wherein the linkage apparatus includes a second link attached to the pivot at a second pivot point, and wherein the first and second pivot points oppose each other.

10. The assembly as set forth in claim 9 wherein the pinion is disposed inside the differential housing at the front end, and the pinion is rotatable about the central axis independently of the pivot, and wherein the pivot is rotatable about the central axis in response to movement of the first and second links.

11. The assembly as set forth in claim 1 wherein the linkage apparatus includes a pivot coupled to the support, and the pivot is rotatable about the central axis relative to the support.

12. The assembly as set forth in claim 11 further including a restrictor that is supported via the differential housing, and configured to selectively restrict rotation of the pivot.

13. The assembly as set forth in claim 11 further including a restrictor that is supported via the differential housing, and a portion of the restrictor is movable between a disengaged position in which the portion of the restrictor is spaced from the pivot and an engaged position in which the portion of the restrictor engages the pivot to restrict rotation of the pivot.

14. An axle assembly for a vehicle, the axle assembly comprising:
an axle housing;
a control-linkage assembly coupled to the axle housing, and the control-linkage assembly includes:
a differential housing fixed to the axle housing to form a unit;
wherein the differential housing includes a first side and a second side spaced from each other relative to a lateral axis, and the first and second sides each define a respective hole along the lateral axis;
wherein the differential housing includes a front end and a rear end spaced from each other relative to a central axis, and the central axis is transverse to the lateral axis;
wherein the differential housing includes a support at the front end;
a linkage apparatus is coupled to the support to control motion of the unit; and
a pinion disposed inside the differential housing, and the support surrounds the pinion.

15. The axle assembly as set forth in claim 14 further including a drive shaft coupled to the pinion at the front end of the differential housing.

16. The axle assembly as set forth in claim 15 further including a connector attached to the pinion at the front end, and wherein the drive shaft is attached to the connector to transfer rotation between the drive shaft and the pinion.

17. The axle assembly as set forth in claim 15 wherein the linkage apparatus includes a pivot coupled to the support and the pivot surrounds the pinion, and wherein the pivot is rotatable about the central axis relative to the support, and wherein the pinion is rotatable about the central axis independently of the pivot.

18. The axle assembly as set forth in claim 17 wherein:
the support includes a sleeve fixed to the differential housing at the front end;
the pinion is disposed through the sleeve; and
the pivot is supported via the sleeve.

19. The axle assembly as set forth in claim 17 wherein:
the support protrudes from the front end;
the pinion is disposed through the support; and
the pivot surrounds the support.

20. A control-linkage assembly for a differential of a vehicle, the control-linkage assembly comprising:
a differential housing including a first side and a second side spaced from each other relative to a lateral axis, and the first and second sides each define a respective hole along the lateral axis;
wherein the differential housing includes a front end and a rear end spaced from each other relative to a central axis, and the central axis is transverse to the lateral axis;
wherein the differential housing includes a support at the front end;
a linkage apparatus is coupled to the support to control motion of the differential housing;
wherein the linkage apparatus includes a pivot coupled to the support, and the pivot is rotatable about the central axis relative to the support; and
a restrictor that is supported via the differential housing, and configured to selectively restrict rotation of the pivot.

\* \* \* \* \*